Figure 1:
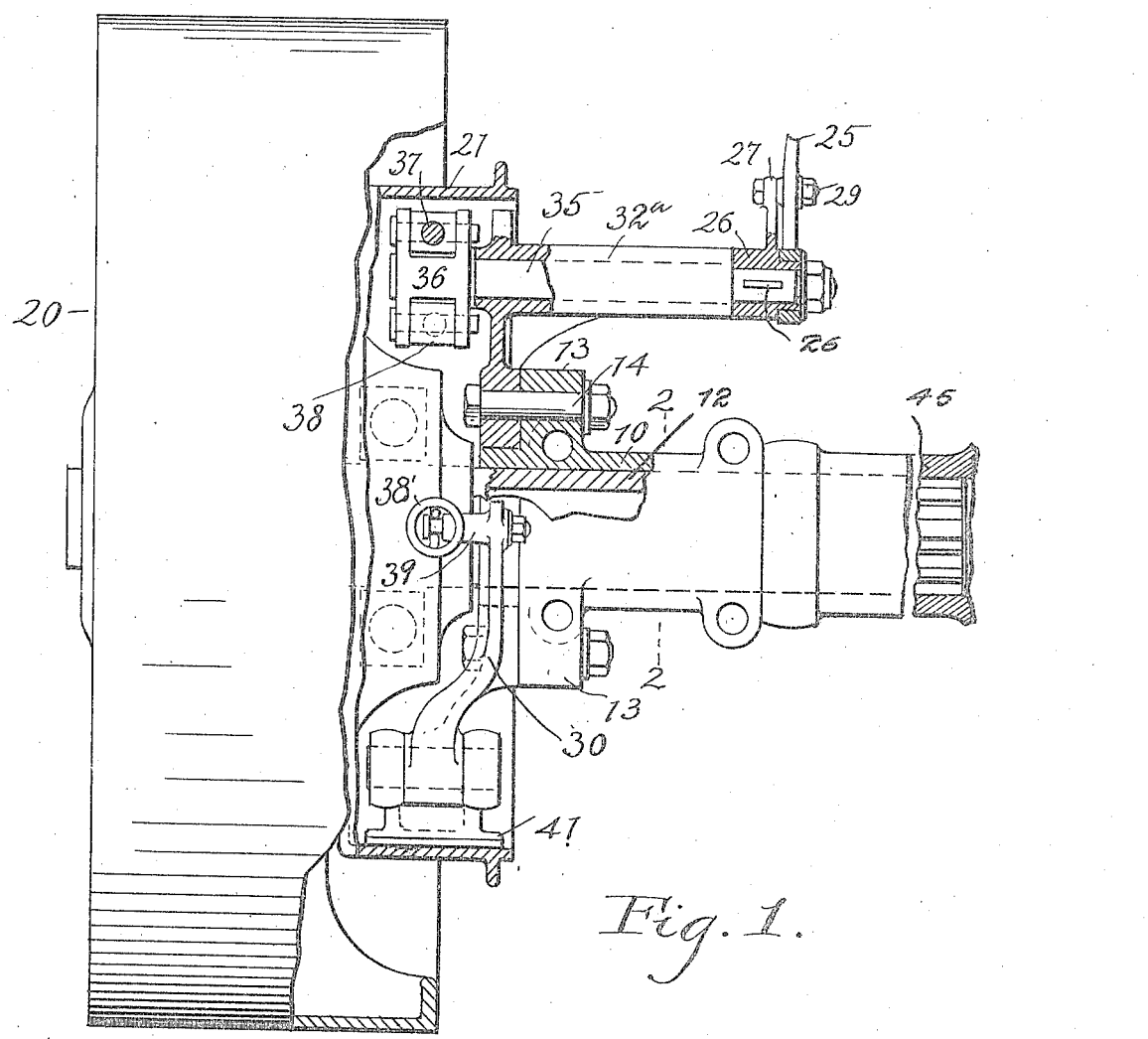

F. H. FARMER.
BRAKE MECHANISM FOR MOTOR VEHICLES.
APPLICATION FILED APR. 14, 1919.
1,431,576.
Patented Oct. 10, 1922.
2 SHEETS—SHEET 2.
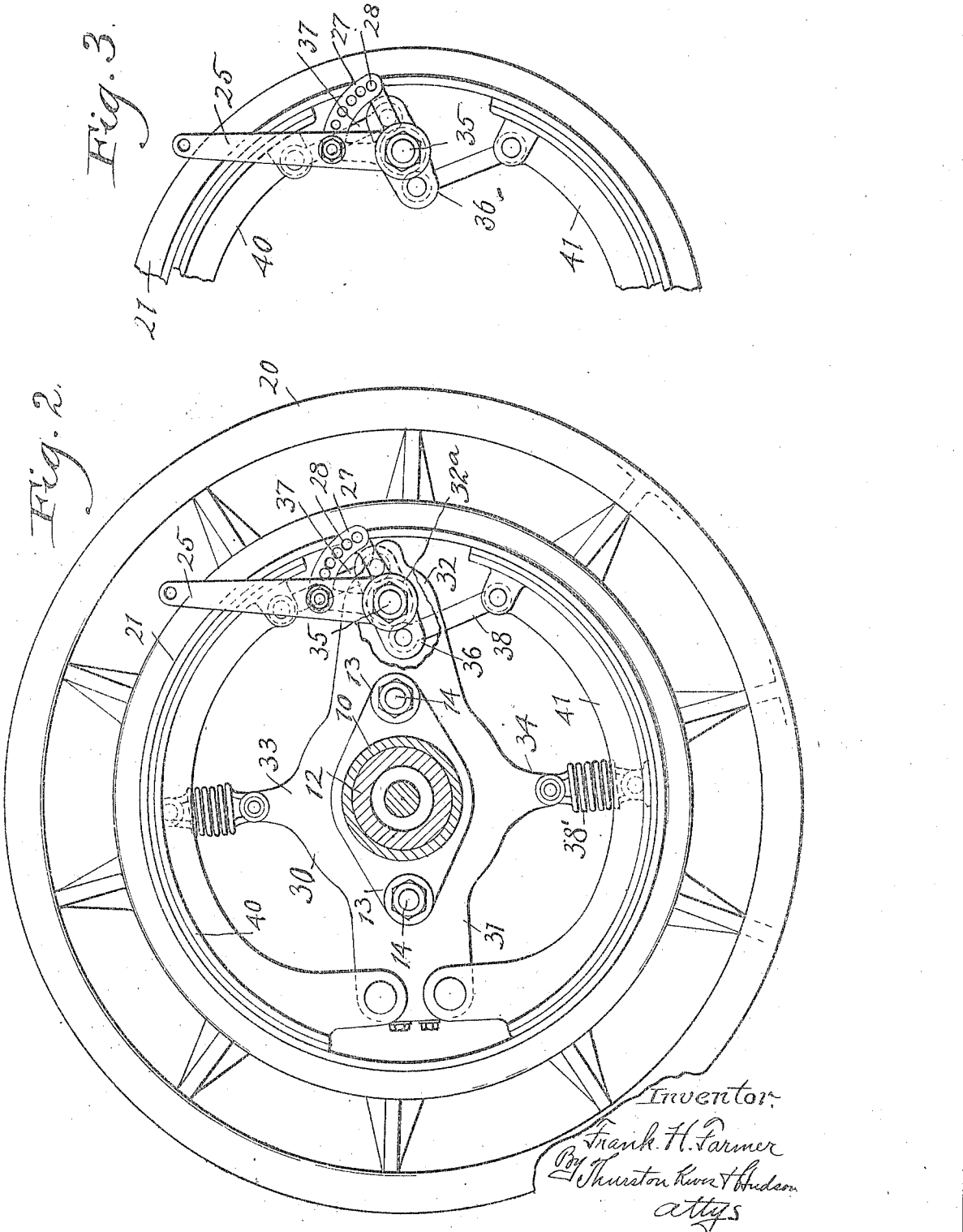

Patented Oct. 10, 1922.

1,431,576

UNITED STATES PATENT OFFICE.

FRANK H. FARMER, OF CLEVELAND, OHIO, ASSIGNOR TO THE WHITE MOTOR COMPANY, OF CLEVELAND, OHIO, A CORPORATION OF OHIO.

BRAKE MECHANISM FOR MOTOR VEHICLES.

Application filed April 14, 1919. Serial No. 289,856.

*To all whom it may concern:*

Be it known that I, FRANK H. FARMER, a citizen of the United States, residing at Cleveland, in the county of Cuyahoga and State of Ohio, have invented a certain new and useful Improvement in Brake Mechanism for Motor Vehicles, of which the following is a full, clear, and exact description.

This invention relates to brake mechanism for the driving wheels of motor vehicles. It is shown in a form especially adapted for use in connection with the internal drive rear axle construction which is shown and described in my prior Patent No. 1,305,453, granted June 3, 1919.

When the invention is used in connection with such a rear axle, the setting of the brakes does not impose any material twisting strains upon the tubular gear cage members upon which the driving wheels are rotatably mounted; and this is a result of considerable importance in connection with rear axle structures in which the driving wheels are rotatably mounted upon tubular gear cage members which in turn are nonrotatably fitted within the tubular ends of the main hollow axle frame member. There are, however, certain features of the invention which are not restricted in their use to rear axle structures like that shown in my prior application; and the object of these features of invention is to provide brakes and brake operating mechanisms such that when the brakes are released they can not drag upon the brake drum. Another object is to provide effective means for applying the brake drum with any necessary force. Another object is to provide means for adjusting the brake operating mechanism in order to compensate for wear, and to enable the application of the brakes through the same train of mechanism which is provided in all motor vehicles for this purpose.

The invention consists in the construction and combination of parts shown in the drawing and hereinafter described and definitely pointed out in the appended claims.

In the drawing, Fig. 1 is a plan view of the mechanism with parts broken away so as to show a considerable part of the mechanism which constitutes the present invention when applied to an internal drive rear axle of the sort described; Fig. 2 is a side view, partly sectioned, in the plane indicated by the irregular line 2—2 on Fig. 1; and Fig. 3 is a detached view of the levers and parts shown on Fig. 2, showing the means located within the brake drum for operating the brake shoes.

Referring to the parts by reference characters, 10 represents one of the tubular ends of the hollow axle frame member; and 12 represents a gear cage tube which is telescopically fitted within said tube and projects beyond the end of said tube 10. It is to be understood that the tube 12 is to be prevented from rotation within the tube 10 by the same means shown for that purpose in said prior patent or some equivalent means. The preferred means mentioned comprising a tongue and groove connection formed in the inner end of the sleeve 12 and the inner wall of the axle housing 10, all of which is indicated at 45 in Fig. 1. It is to be understood also that the wheel 20 is rotatably mounted upon the projecting end of the gear cage tube 12.

21 represents a cylindrical brake drum which is connected with the wheel by the usual or any suitable means. A brake supporting bracket 30 is fitted upon the end of the tube 10 so that it will always occupy a concentric relation with said tube. The tube itself is formed with two ears 13—13 against which the outer face of the bracket engages and to which said bracket is secured by the bolts 14. This brake bracket is formed with four arms 31, 32, 33, 34, arranged about 90° apart. These brake brackets carry the brakes and brake operating mechanisms. But because said brackets are attached to tubes 10 instead of tubes 12, the twisting strains due to setting the brakes are taken up by tubes 10, and are not transmitted to tubes 12. If they were, such strains would tend to break the means for preventing the rotation of tubes 12 in tubes 10.

40—41 represent two brake shoes which are respectively pivoted to the rear arm 31, at points which are about an inch apart. Each brake shoe is of such length that it may engage with about one third of the inner surface of the brake drum. The front arm 32 of said brake bracket 30 is formed with a long transversely extended bearing sleeve 32$^a$, and in this sleeve the brake operating shaft 35 is rotatably mounted. A rocker 36 is fixed centrally to that part of the shaft 35 which projects outward beyond the bearing sleeve 32$^a$. Both arms of this rocker are forked. One forked end of the rocker is connected by a link 37 with the adjacent end of the brake shoe 40, while the other arm of said rocker is connected by a link 38 with the adjacent end of the other brake shoe 41. A brake operating lever arm 25 is fixed to the outer end of the shaft 35. By drawing the outer end of this lever forward the shaft 35 will be rocked, and as a result both brake shoes will, through the described mechanism, be forced against the inner surface of the brake drum 21. The connection between the operating lever 25 and shaft 35 is adjustable in order that it may be reset as wear upon the breaking surfaces takes place. To this end a collar 26 is keyed as at 26′ or otherwise fixed to the shaft 35, and this collar carries a segment 27 in which are a plurality of holes 28. A bolt 29 may be employed to connect the operating lever 25 with this segment, and this bolt may of course go through any one of the holes 28.

The vertical arms 33, 34, of the brake bracket carry posts 39 as shown in Fig. 1. Contractile coil springs 38′ are connected with these posts and with the two brake shoes 40, 41, respectively, and they act, when permitted, to swing said brake shoes upon their pivots so as to wholly withdraw them from contact with the brake drum.

The operation of the device is as follows: When the lever 25 is in the position shown in Fig. 2, the spring 38 will retract the brake shoes 40 and 41, so that they are not in gripping position. Upon movement of the lever 25 in the direction to set the brake shoes, the levers 37 and 38 are moved outwardly thereby moving the brake shoes into contact with the inner surface of the brake drum.

As before explained, as wear may occur and it is desirable to take up this wear, the position of the lever 25 with respect to the operating sleeve 32ª may be adjusted by relatively positioning the sleeve 26 with respect to the lever 25.

Having described my invention, I claim:—

1. In a driving axle for a motor vehicle, the combination of a hollow axle frame member having tubular ends, and, associated with each end, a gear cage tube which telescopes into the same and is non-rotatably supported therein, a driving wheel which is rotatably mounted upon said gear cage tube and is provided with a concentric brake drum, a brake supporting bracket which is fitted upon and is rigidly secured to the tubular end of the axle frame member, and brake mechanism supported by said bracket.

2. In a driving axle for a motor vehicle, the combination of a hollow axle frame member having end tubes and substantially radial ears adjacent the extreme ends of said tubes, and, associated with each end tube, a gear cage tube which telescopes into the same and is nonrotatably supported therein, a driving wheel which is rotatably mounted upon the projecting outer end of said gear cage tube, which wheel is provided with a brake drum, a brake supporting bracket which embraces and fits upon the outer end of said end tube of the axle frame member, bolts connecting the radial ears of said end tube with said brake supporting bracket, and brake mechanism located within said brake drum and supported by said bracket.

3. In a driving axle for a motor vehicle, the combination of a hollow axle frame member having tubular ends, and, associated with each end, a brake supporting bracket which embraces and is secured thereto, said brake supporting bracket having a rearwardly projecting arm, a forwardly projecting arm, and two arms which project respectively up and down, two brake shoes which are pivoted to the rearwardly projecting arm and which extend respectively above and below the axis of the driving axle, a brake operating shaft rotatably mounted on the forwardly extended arm of the brake supporting bracket, a rocker fixed to the end of said shaft and extending to opposite sides thereof, links connecting opposite ends of said rocker with the adjacent ends of the two brake shoes respectively, and contractile coil springs which are respectively connected with the upwardly and downwardly extended arms of the brake supporting bracket and with the two brake shoes.

In testimony whereof, I hereunto affix my signature.

FRANK H. FARMER.